(12) United States Patent
Mao

(10) Patent No.: US 8,048,552 B1
(45) Date of Patent: Nov. 1, 2011

(54) BATTERY MODULE MOUNT

(75) Inventor: Yanmin Mao, Brampton (CA)

(73) Assignee: Psion Inc., Mississauga, ON (CA)

( * ) Notice: Subject to any disclaimer, the term of this patent is extended or adjusted under 35 U.S.C. 154(b) by 0 days.

(21) Appl. No.: 12/766,029

(22) Filed: Apr. 23, 2010

(51) Int. Cl.
*H01M 2/10* (2006.01)
(52) U.S. Cl. .......................................... 429/97
(58) Field of Classification Search ................. None
See application file for complete search history.

(56) References Cited

U.S. PATENT DOCUMENTS

| | | | | |
|---|---|---|---|---|
| 5,213,913 | A | * | 5/1993 | Anthony et al. ................. 429/97 |
| 5,225,293 | A | * | 7/1993 | Mitchell et al. ................. 429/97 |
| 5,649,750 | A | | 7/1997 | Ishii et al. |
| 2002/0155344 | A1 | * | 10/2002 | Maple ............................. 429/99 |
| 2006/0199072 | A1 | * | 9/2006 | Lui et al. ........................ 429/97 |
| 2006/0202659 | A1 | | 9/2006 | Nagano |
| 2007/0042232 | A1 | * | 2/2007 | Takeshita et al. ................ 429/1 |
| 2009/0008948 | A1 | | 1/2009 | Ho et al. |

FOREIGN PATENT DOCUMENTS

JP      5021046      1/1993

OTHER PUBLICATIONS

European Search Report, Feb. 18, 2011, Application No. 10193516. 1-1227.

* cited by examiner

*Primary Examiner* — Jonathan Crepeau

(57) ABSTRACT

A battery module mount for securing a battery module to a housing of a handheld device, including one or more latch elements attached to the housing and movable between a free position and an unlatched position, with a tab portion, and one or more elongate resilient elements biasing each latch element to the free position. Each latch element is positionable in a latched positions. The mount also includes one or more mating means attached to the battery module with an abutment with which the tab portion is engageable when the latch element is in the latched position, to hold the abutment in a retainable position, thereby securing the battery module to the housing. The tab portion is disengaged from the abutment when the latch element is in the unlatched position, to permit removal of the battery module from the housing.

21 Claims, 22 Drawing Sheets

BATTERY MODULE MOUNT

FIELD OF THE INVENTION

The present invention is a battery module mount for securing a battery module to a housing of a handheld device.

BACKGROUND OF THE INVENTION

Various electronic devices include battery modules, for powering the devices. Handheld electronic devices typically include a body in which the battery module is retained by a retention means. However, in general, the user operates the existing retention means using both hands.

SUMMARY OF THE INVENTION

For the foregoing reasons, there is a need for a battery module mount which mitigates or overcomes one or more of the defects of the prior art. For example, a retention means operable by one hand only would be advantageous.

In its broad aspect, the invention provides a battery module mount for securing a battery module to a housing of a handheld device. The battery module mount includes one or more latch elements attached to the housing and movable between a free position and an unlatched position, the latch element having a tab portion, and one or more elongate resilient elements biasing the latch element to the free position. Each latch element is positionable in a latched position, in which the resilient element urges the latch element to the free position. The battery module mount also includes one or more mating means attached to the battery module with an abutment with which the tab portion is engageable when the latch element is in the latched position, to hold the abutment in a retainable position, thereby securing the battery module to the housing. The tab portion is disengaged from the abutment when the latch element is in the unlatched position, to permit removal of the battery module from the housing.

In another aspect, the invention provides a latch assembly for co-operating with one or more mating means to secure a battery module to a housing of a handheld device. The latch assembly includes one or more latch elements attachable to the housing and movable between a free position and an unlatched position, the latch element having a tab portion, and one or more elongate resilient elements biasing the latch element to the free position. Each latch element is positionable in a latched position, in which the resilient element urges the latch element to the free position. The tab portion is engageable to hold an abutment included in the mating means in a retainable position when the latch element is in the latched position, thereby securing the battery module to the housing. The tab portion is disengagable from the abutment when the latch element is in the unlatched position, to permit removal of the battery module from the housing.

In yet another aspect, the invention provides a handheld device including a housing, a battery module, and a battery module mount for securing the battery module to the housing. The battery module mount includes one or more latch elements attached to the housing and movable between a free position and an unlatched position, the latch element having a tab portion, and one or more elongate resilient elements biasing the latch element to the free position. Each latch element is positionable in a latched position, in which the resilient element urges the latch element to the free position. The battery module mount also includes one or more mating means attached to the battery module with an abutment with which the tab portion is engageable when the latch element is in the latched position, to hold the abutment in a retainable position, thereby securing the battery module to the housing. The tab portion is disengaged from the abutment when the latch element is in the unlatched position, to permit removal of the battery module from the housing.

BRIEF DESCRIPTION OF THE DRAWINGS

The invention will be better understood with reference to the attached drawings, in which.

DETAILED DESCRIPTION

Figure 8:
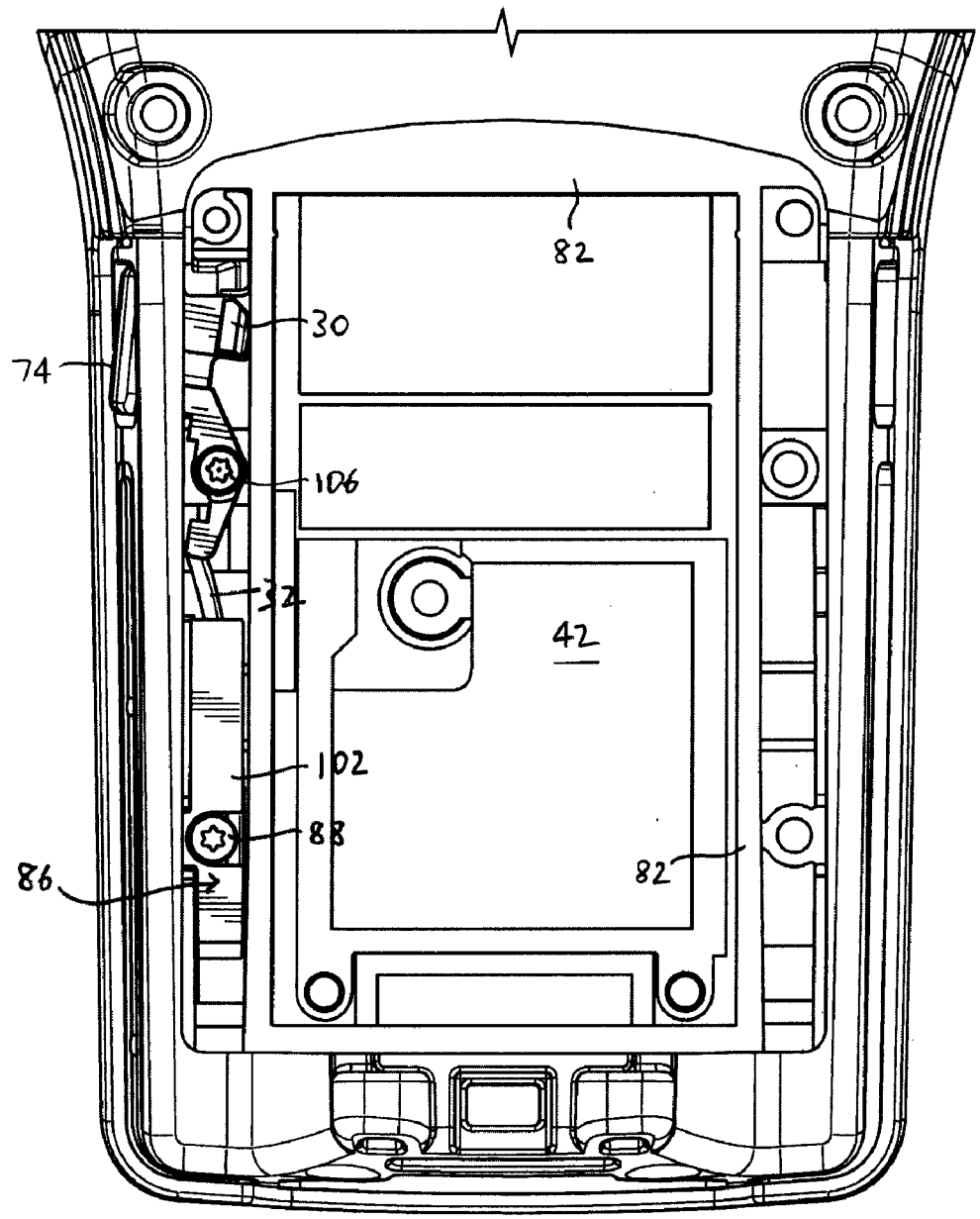
FIG. 8 is a bottom plan view of the housing and the latch assembly of FIG. 5 in which the latch element is in the unlatched position, drawn at a smaller scale.
Figure 9:
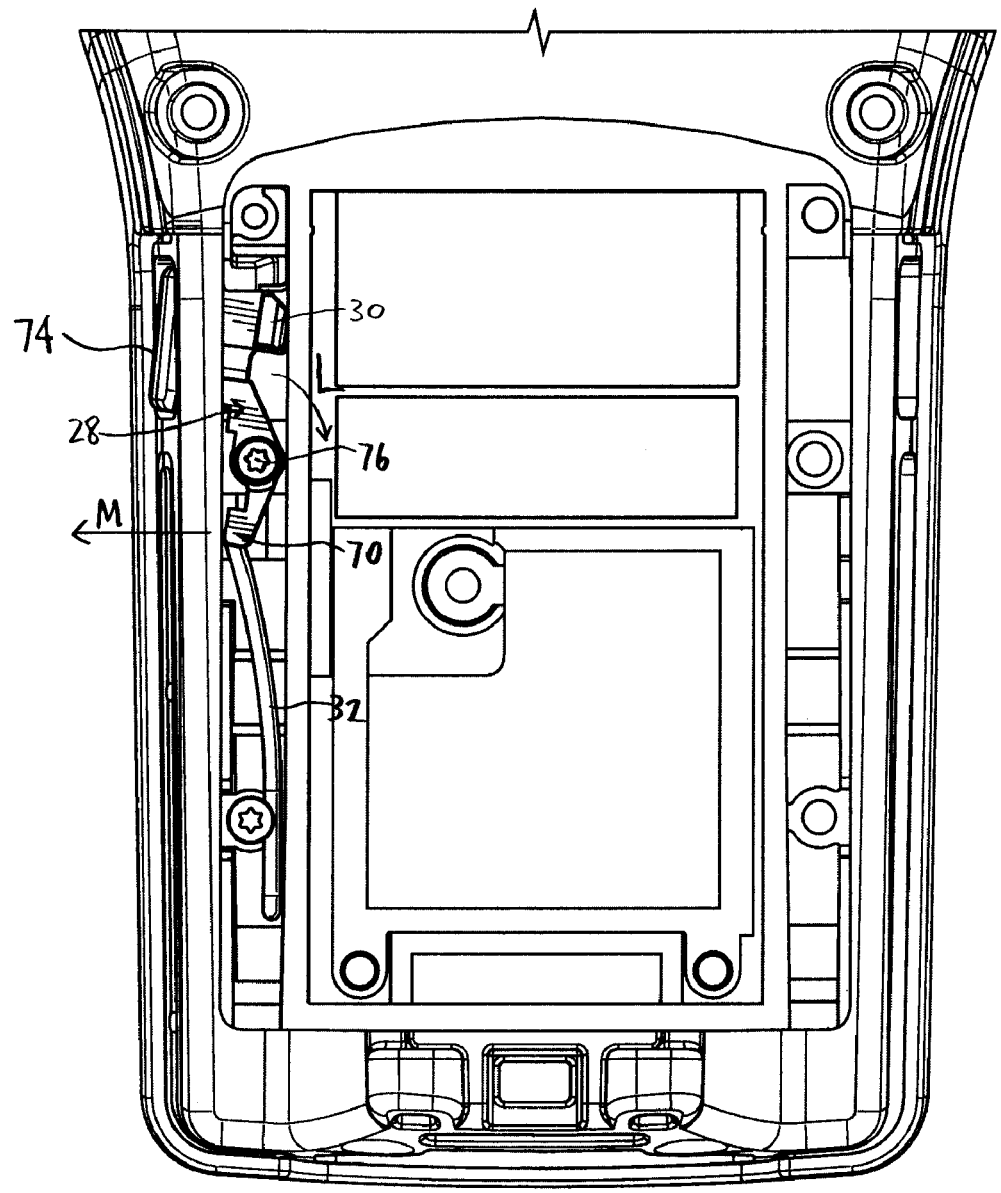
FIG. 9 is a bottom plan view of the housing and the latch assembly of FIG. 8 in which the anchor portion is omitted, for illustrative clarity.
Figure 10:
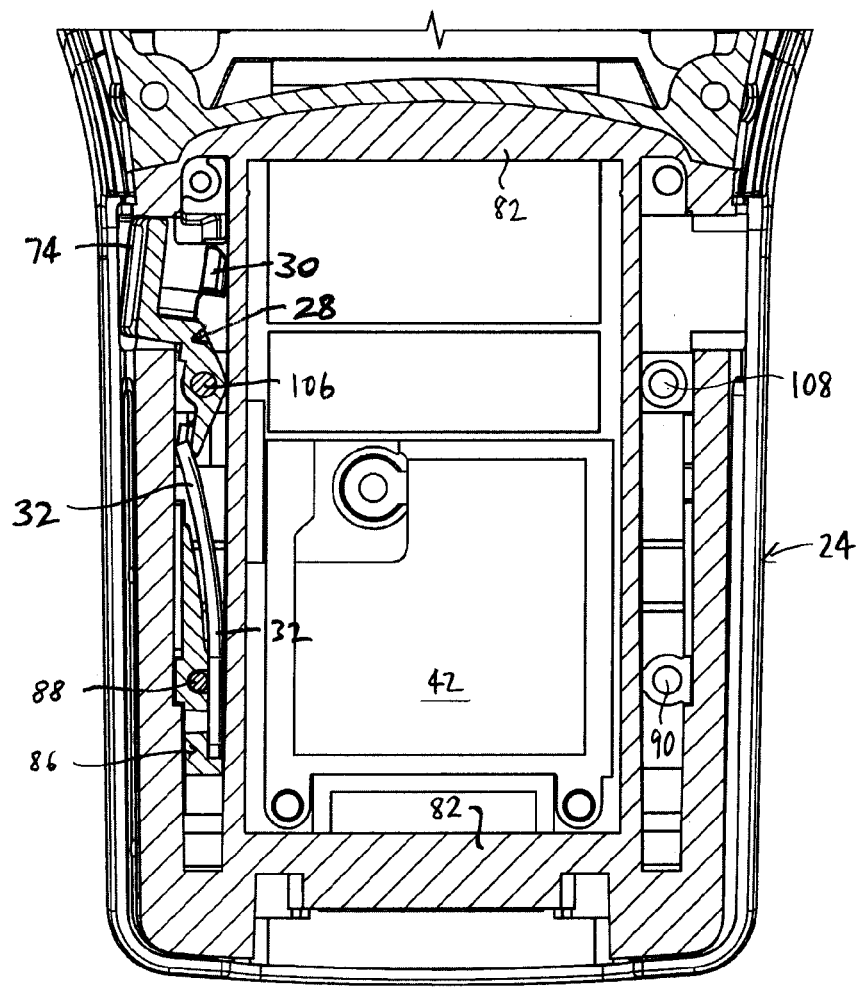
FIG. 10 is a cross-section of the housing and the latch assembly of FIG. 8.

In the attached drawings, like reference numerals designate corresponding elements throughout. Reference is made to FIGS. 1-14 to describe a battery module mount in accordance with the invention indicated generally by the numeral 20 (FIGS. 3A-3E). The battery module mount 20 is for securing a battery module 22 to a housing 24 of a handheld device 26 (FIGS. 1-3E). In one embodiment, the battery module mount 20 preferably includes one or more latch elements 28 attached to the housing 24 and movable between a free position (FIGS. 5, 6) and an unlatched position (FIGS. 8-10). The latch element 28 preferably includes a tab portion 30, as will be described. As can be seen in FIGS. 7 and 10, the battery module mount 20 preferably also includes one or more elongate resilient elements 32 biasing the latch element 28 to the free position. Preferably, the latch element 28 is positionable in a latched position (FIG. 7), in which the resilient element 32 urges the latch element 28 to the free position. It is also preferred that the battery module mount 20 includes one or more mating means 34 attached to the battery module 22 and comprising an abutment 36 with which the tab portion 30 is engageable when the latch element 28 is in the latched position, to hold the abutment 36 in a retainable position (FIGS. 3A, 3B), thereby securing the battery module 22 to the housing 24. In one embodiment, the tab portion 30 is disengaged from the abutment 36 when the latch element 28 is in the unlatched position (FIG. 3C), to permit removal of the battery module 22 from the housing 24.

Figure 1:
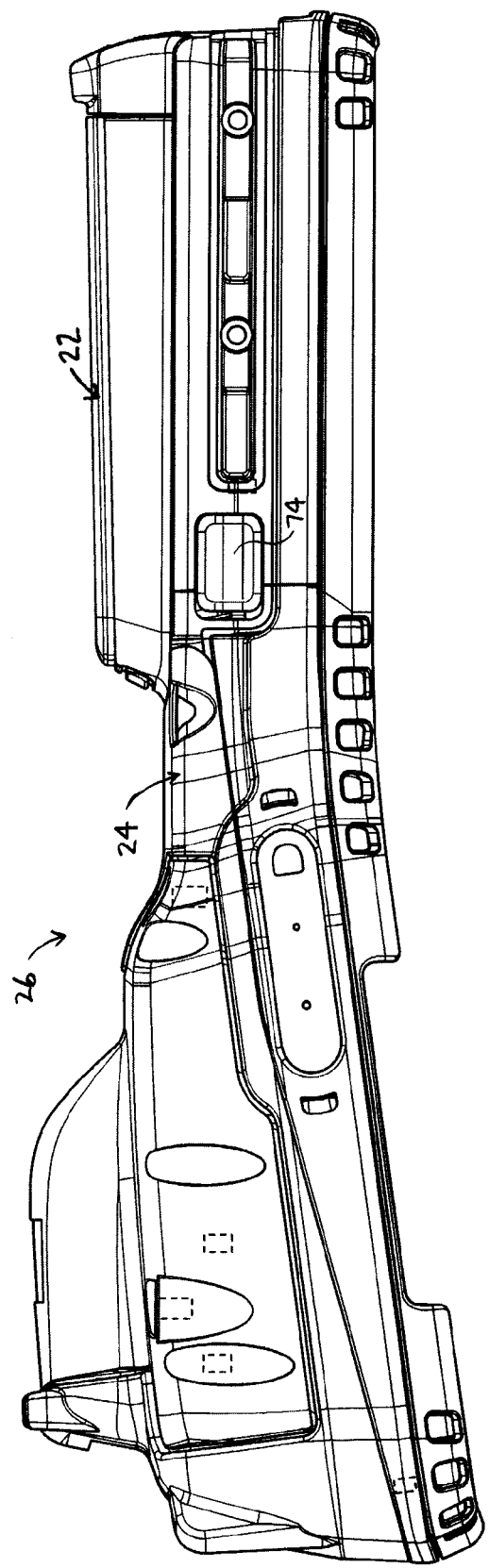
FIG. 1 is a side view of an embodiment of a handheld device of the invention.
Figure 2A:
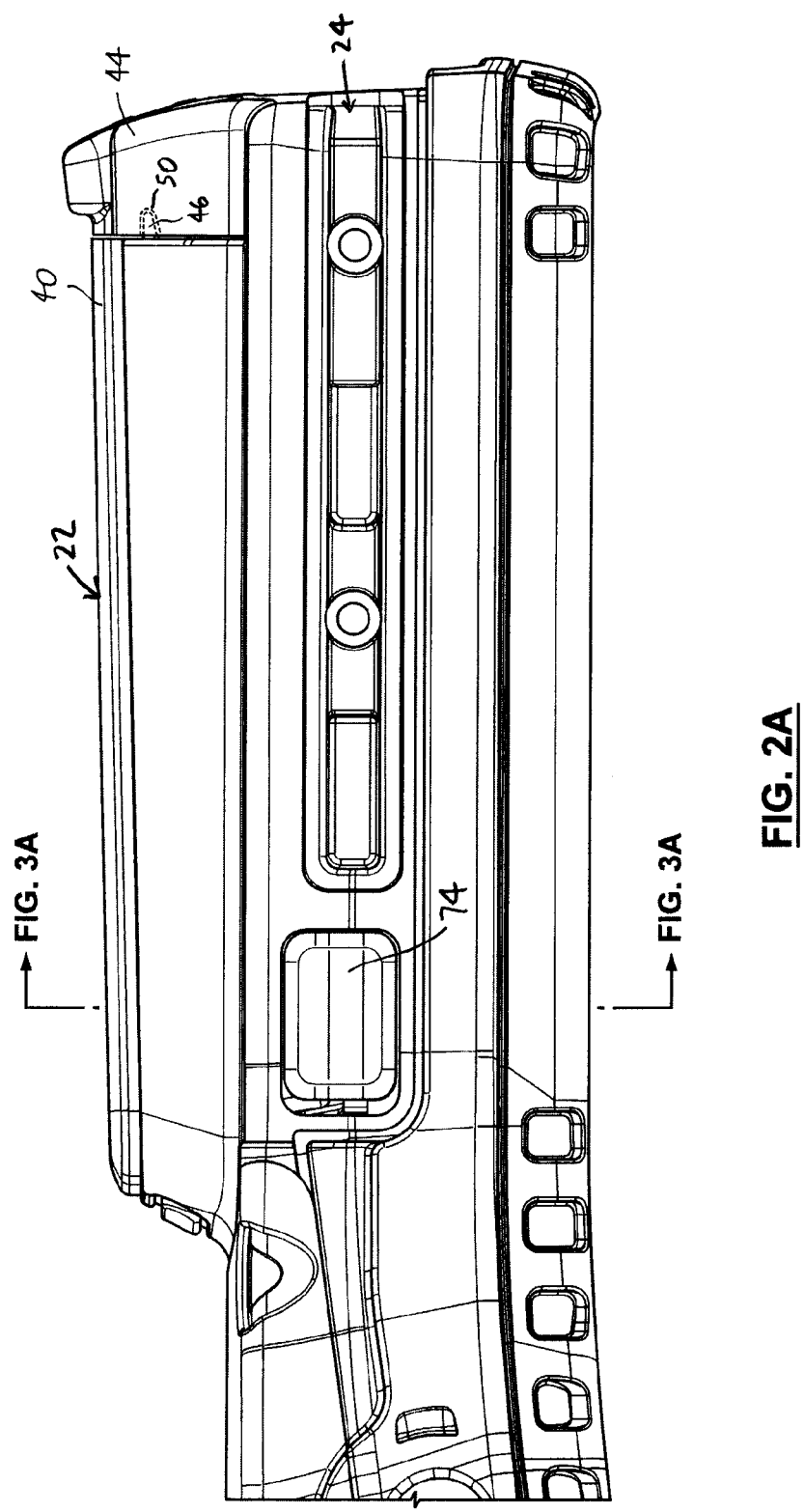
FIG. 2A is a side view of a portion of the handheld device of FIG. 1 in which a battery module thereof is secured to a housing thereof, drawn at a larger scale.
Figure 2B:
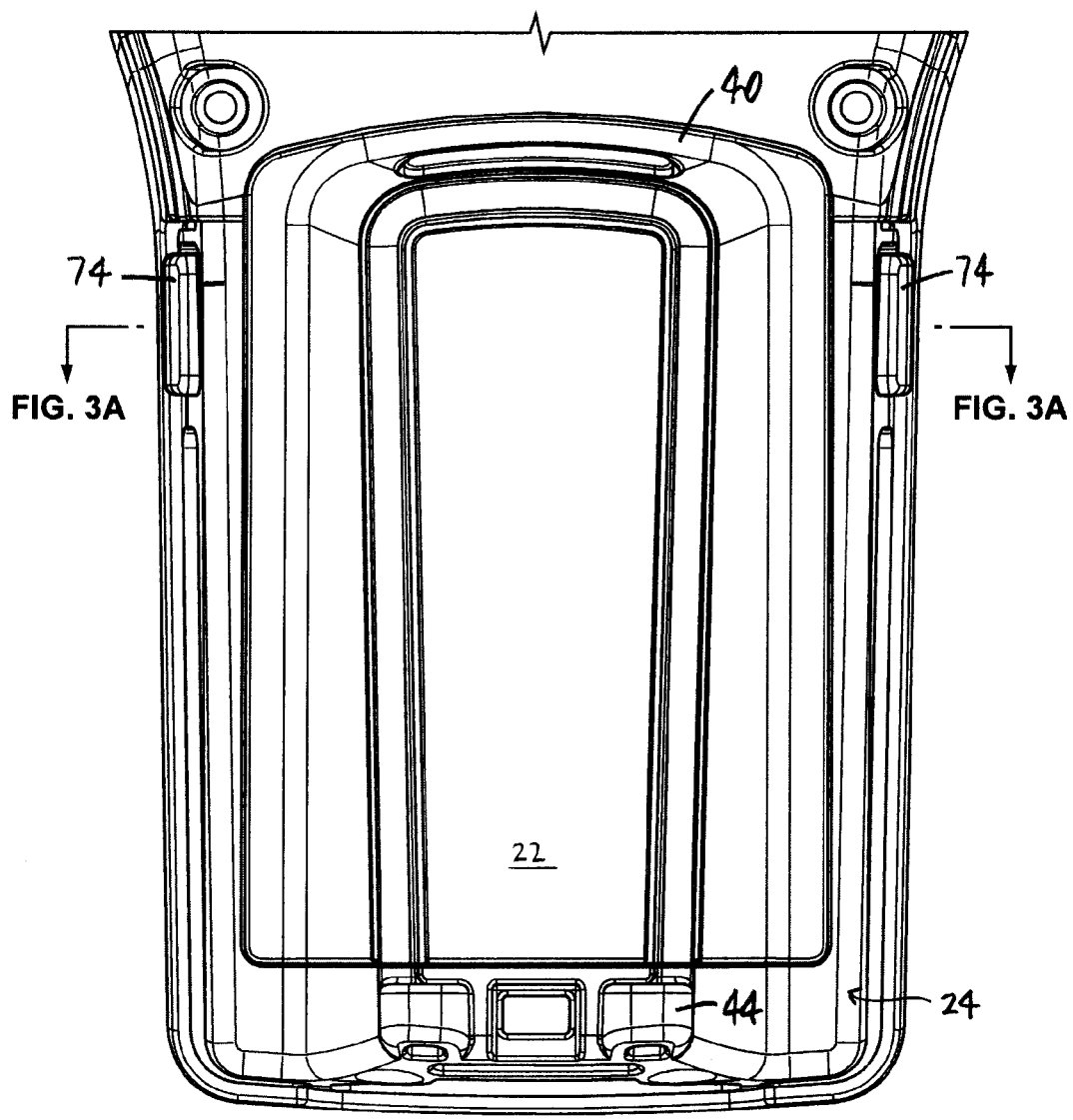
FIG. 2B is a bottom plan view of the portion of the handheld device of FIG. 2A.
Figure 3A:
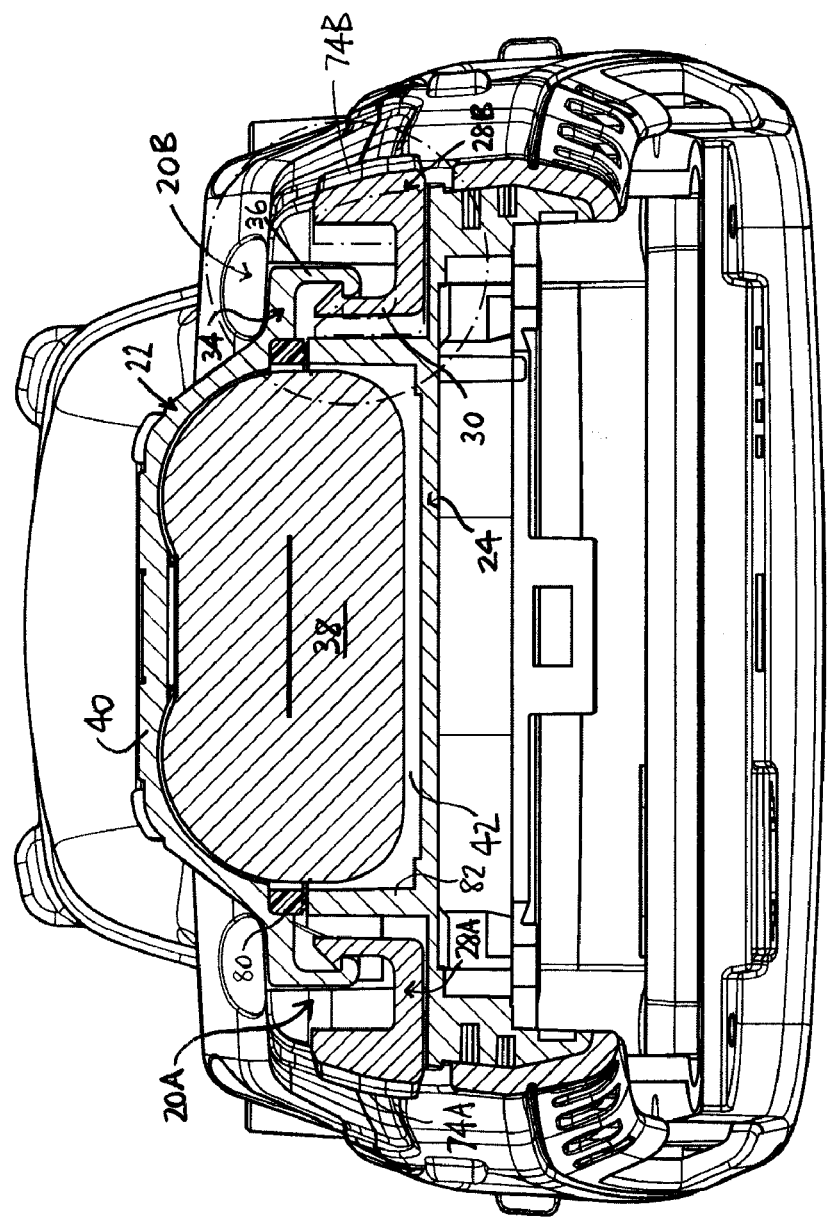
FIG. 3A is a cross-section of the handheld device of FIG. 1 taken along the line identified therefor in FIGS. 2A and 2B, drawn at a larger scale.
Figure 4:
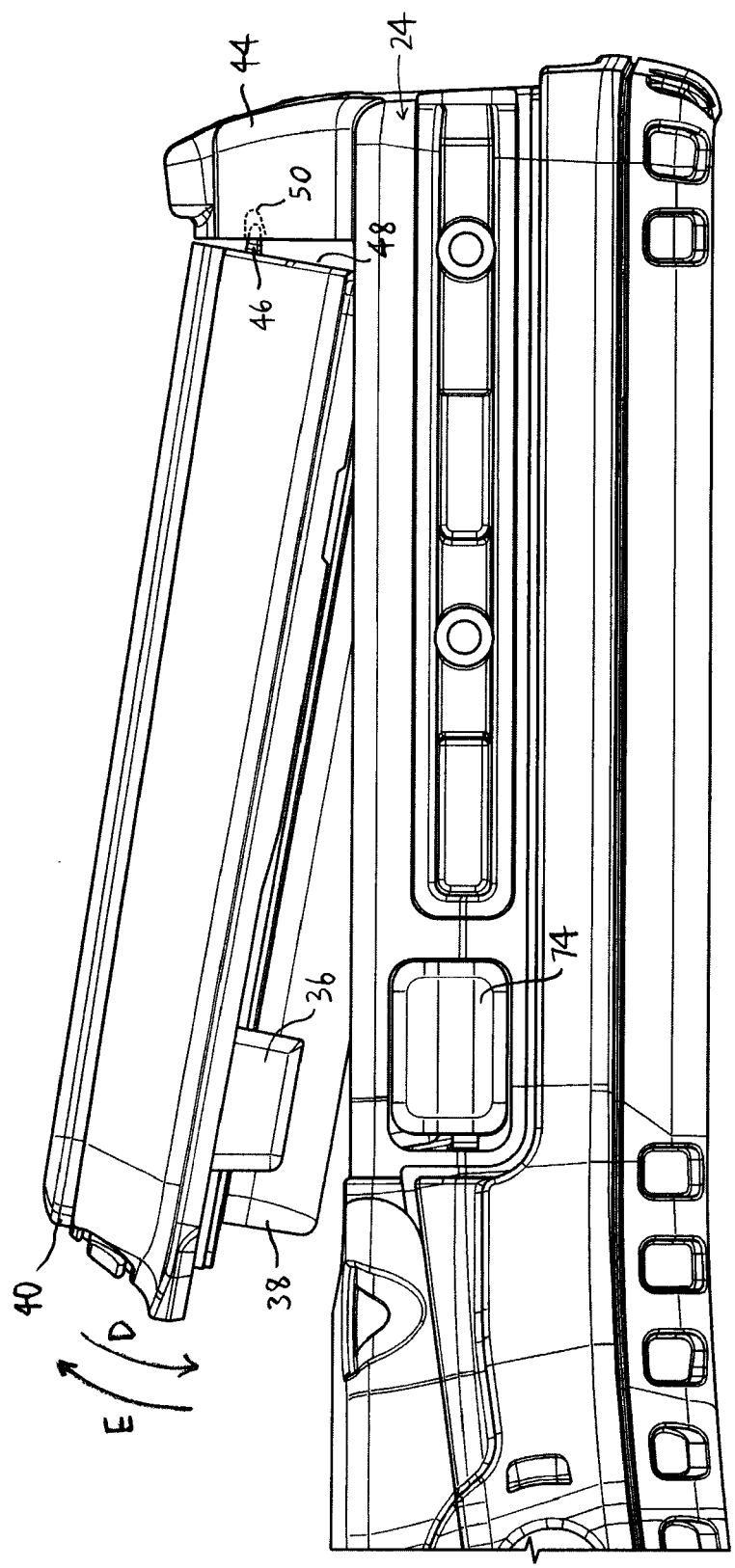
FIG. 4 is a side view of the handheld device of FIG. 2A in which the battery module is positioned for insertion into a recess in the housing, or removal therefrom, drawn at a smaller scale.

As can be seen in FIGS. 1, 2A, and 4, the housing 24 preferably is adapted to at least partially receive the battery module 22 therein. Also, the battery module 22 preferably includes a battery 38 and a cover portion 40 (FIG. 3A). It is preferred that the housing 24 includes a recess 42 in which at least part of the battery module 22 is receivable (FIG. 3A). In one embodiment, the housing 24 preferably includes a wall portion 44 positioned adjacent to the recess 42, the wall portion 44 being adapted to cooperate with the battery module 22 to secure the battery module 22 to the housing 24. Preferably, the battery module 22 includes one or more prongs 46 extending from a rear surface 48 of the battery module 22 formed and positioned to be received in corresponding apertures 50 in the wall portion 44 (FIGS. 2A, 4), as will be described.

In FIG. 3A, it can be seen that the handheld device 26 preferably includes two battery mounts, identified for convenience in FIG. 3A as 20A and 20B. To simplify the description, only the battery mount identified as 20B in FIG. 3A will be described in detail, and it will be understood that the battery mount 20A is identical to battery mount 20B in all relevant respects, battery mount 20A being a mirror image of battery mount 20B.

Figure 3B:
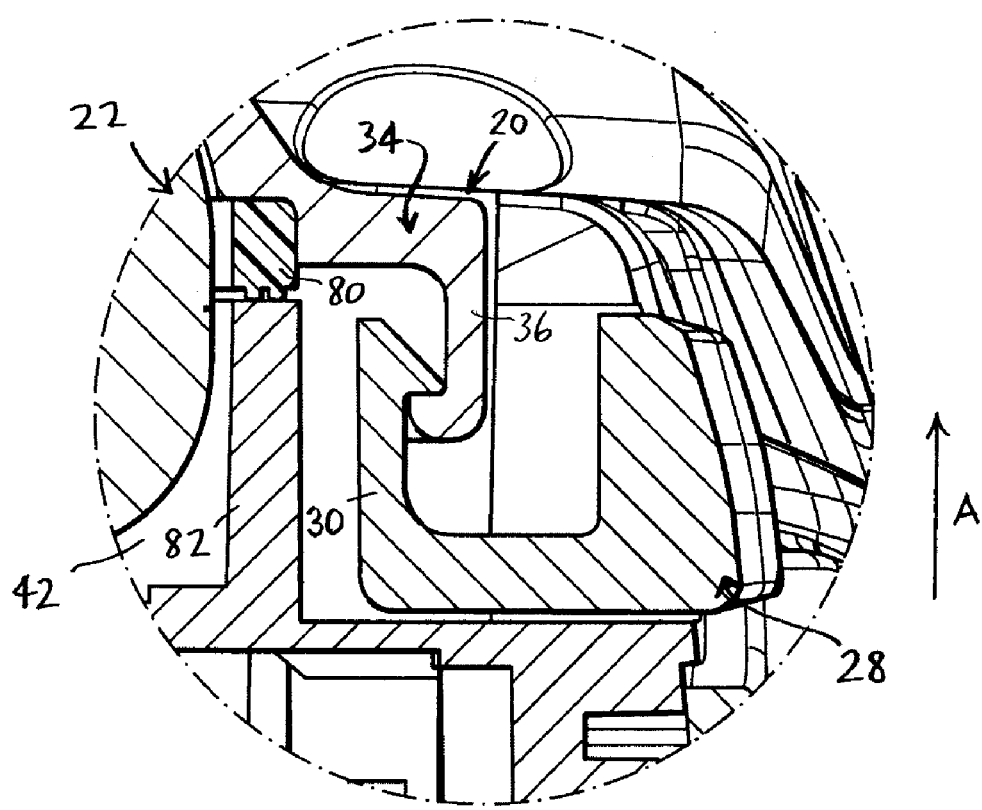
FIG. 3B is a portion of the cross-section of FIG. 3A showing an embodiment of a latch element of the invention in a latched position holding an embodiment of an abutment of the invention in a retainable position, drawn at a larger scale.

As can be seen in FIGS. 3A and 3B, when the battery module 22 is secured to the housing 24, the latch element 28 is in the latched position, and the tab portion 30 thereof is engaged with the abutment portion 36, which is in the retainable position (FIG. 3A). Preferably, the mating means 34 is included in the cover portion 40. It is preferred that the mating means 34 is integrally formed in the cover portion 40, and the abutment 36 extends from the cover portion 40 (FIG. 3A). The abutment 36 preferably includes an elongate intermediate part 54 extending between the cover portion 40 and a terminal part 56 comprising a substantially planar first mating surface 58 (FIG. 3C).

Figure 3C:
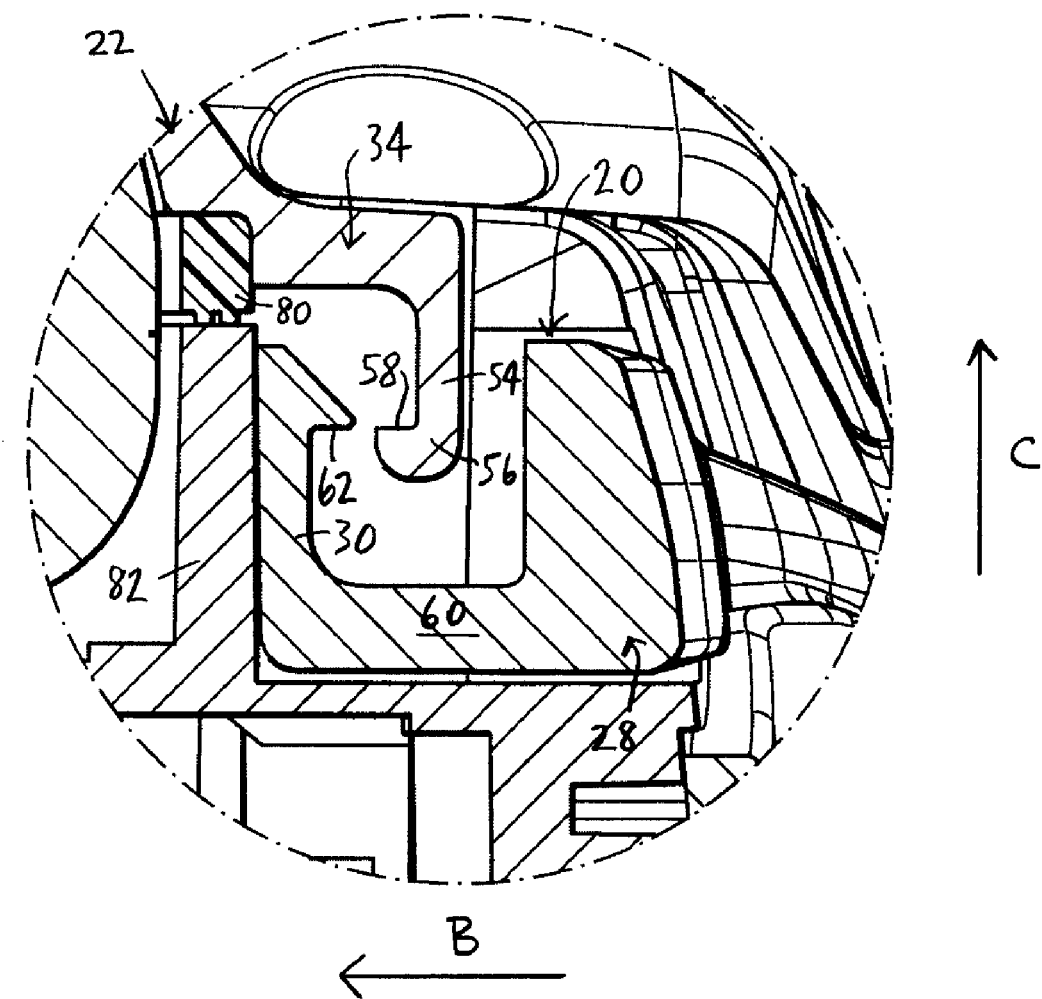
FIG. 3C is a cross-section showing the latch element of FIG. 3B in an unlatched position.

As shown in FIG. 3C, the tab portion 30 preferably extends from a body portion 60 of the latch element 28, and the tab portion 30 also preferably includes a second mating surface 62 formed and positioned to engage the first mating surface 58, to hold the abutment 36 in the retainable position. As can be seen in FIGS. 3A and 3B, when the abutment 36 is in the retainable position and the latch element 28 is in the latched position, the second mating surface 62 is engaged with the first mating surface 58, movement of the abutment 36 away from the housing 24 (i.e., in the direction indicated by arrow "A" in FIG. 3B) is prevented by the tab portion 30.

In FIG. 3C, the latch element 28 is shown in the unlatched position. It will be appreciated by those skilled in the art that the latch element 28 is moved from the latched position (FIGS. 3A, 3B) to the unlatched position (FIG. 3C) by a user (not shown), as will be described. For example, the latch element 28 is moved in the direction indicated by arrow "B" in FIG. 3C from the latched position to the unlatched position thereof. As can be seen in FIG. 3C, when the latch element 28 is in the unlatched position, the first and second mating surfaces 58, 62 are disengaged, and the abutment is movable away from the housing 24 (i.e., out of the retainable position), as indicated by arrow "C" in FIG. 3C.

Referring to FIG. 4, it can be seen that the battery module 22 preferably is pivoted into and out of the recess 42 (as indicated by arrows "D" and "E" in FIG. 4 respectively) once the prongs 46 are located in the apertures 50. For example, if the battery module 22 is to be removed from the housing 24, the latch element 28 is moved from the latched position to the unlatched position (FIG. 3C), and the battery module 22 is then movable away from the housing 24. Alternatively, if the battery module 22 is to be moved into the recess, the battery module 22 is pivoted downwardly, as indicated by arrow D in FIG. 4.

Figure 3D:
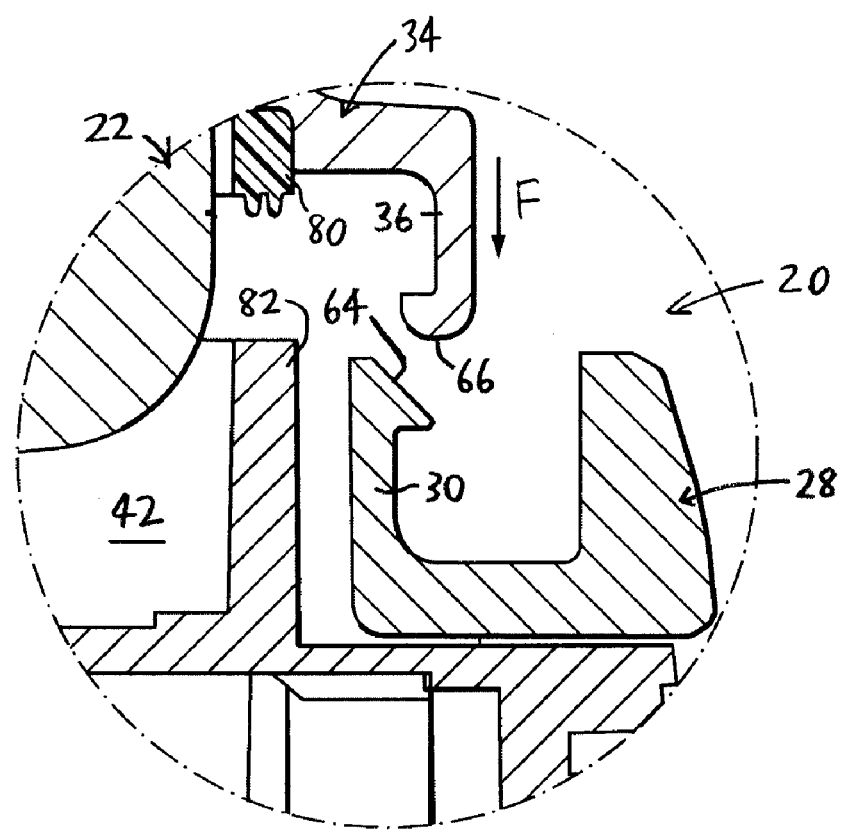
FIG. 3D is a cross-section showing the abutment positioned for engagement with a tab portion of the latch element, when the latch element is in a free position.
Figure 3E:
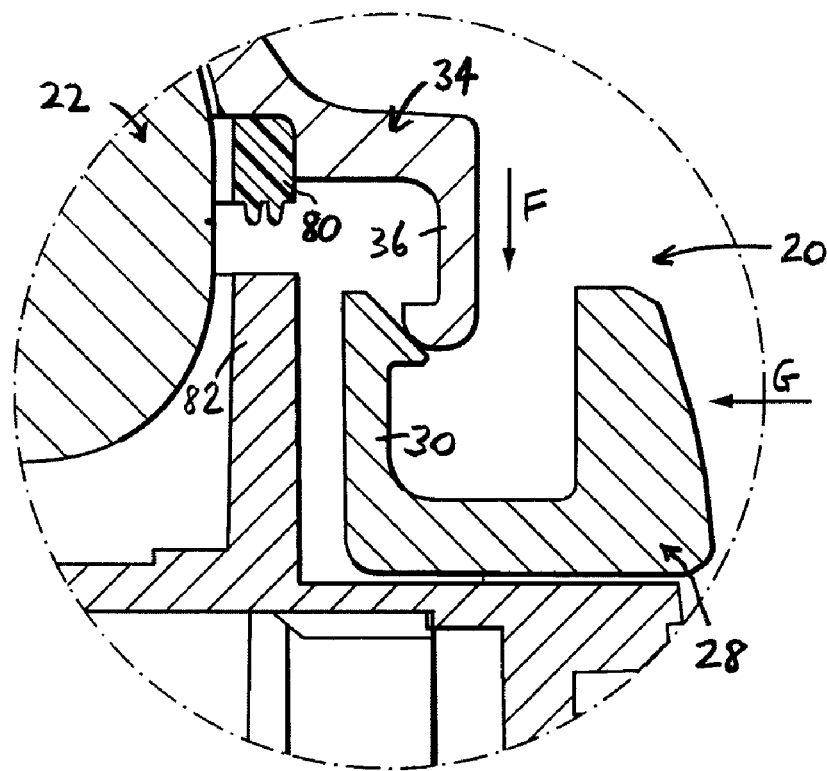
FIG. 3E is a cross-section showing the abutment engaging the tab portion as the abutment is moved to the retainable position.

Preferably, the tab portion 30 includes a first engagement surface 64 formed for slidingly engaging a second engagement surface 66 of the abutment 36, when the latch element 28 is in the free position (FIG. 3D), as the abutment 36 is moved into the retainable position. It is preferred that the first engagement surface 64 is substantially planar and the second engagement surface 66 is at least partially rounded (FIG. 3D). For instance, referring to FIGS. 3D and 3E, when the battery module 22 is pivoted as indicated by arrow D in FIG. 4, the abutment 36 is moved toward the housing 24, i.e., in the direction indicated by arrow "F" in FIG. 3D. The first and second engagement surfaces 64, 66 are aligned for engagement as the abutment 36 is moved toward the housing 24. As shown in FIG. 3E, when the first and second engagement surfaces 64, 66 engage, the tab portion 30 is urged in a lateral direction as the abutment 36 presses against the tab portion 30 because of the position of the first engagement surface 64 relative to the direction in which the abutment 36 is moving, i.e., the first engagement surface 64 is positioned at a suitable angle (e.g., approximately 35 degrees) relative to the abutment's direction of travel. Lateral movement of the tab portion 30 in the direction indicated by arrow "G" in FIG. 3E results from the pressure exerted on the first engagement surface 64 by the second engagement surface 66, causing the latch element 28 to move in the direction indicated by arrow G. From FIGS. 3A-3E, it can be seen that, as the abutment 36 is moved toward the housing 24, the tab portion 30 is urged further in the direction indicated by arrow G until the abutment 36 is in the retainable position, when the second mating surface 62 is positioned to move past the first mating surface 58, and into engagement therewith. Preferably, the tab portion 30 and the abutment 36 cooperate, as the abutment 36 is moved into the retainable position and the latch element 28 moves to the latched position, to provide an audible signal (e.g., a "click") confirming that the tab portion 30 engages the abutment 36 to hold the abutment 36 in the retainable position. It will be understood that the disengagement of the first and second engagement surfaces 64, 66, i.e., immediately after the second engagement surface 66 has moved past the first engagement surface 64 (resulting in movement of the abutment 36 to the retainable position), is rapid, as is movement of the tab portion 30 to the latched position at that point.

From the foregoing, it can be seen that, when the abutment 36 moves to the retainable position and the latch element 28 moves to the latched position (i.e., so that the second mating surface 62 is positioned adjacent to the first mating surface 58), the latch element 28 and the abutment 36 cooperate to produce the audible signal confirming that the battery module 22 is secured to the housing 24.

The latch element 28 and other elements connected thereto are shown in FIGS. 5-10. As can be seen in FIGS. 5-10, the latch element and related elements are mounted in a slot 69 in the housing 24, proximal to the recess 42. It will be understood that the handheld device 26 preferably includes two latch elements 28, one in each of the slots identified in FIG. 5 for convenience as 69A and 69B. It will also be understood that only one of two latch elements is shown in FIGS. 5-10 for illustrative clarity, although in use, two latch elements preferably are mounted in the respective slots 69. In FIGS. 5-10, the slot 69 on the right-hand side of the housing 24 (as presented in FIGS. 5-10) is shown without the latch element and related elements therein. In one embodiment, the resilient element 32 is pivotable about a first pivot point 68 and engages the latch element 28 at an engagement region 70 thereon. The first pivot point 68 and the engagement region 70 preferably are spaced apart by a preselected distance 72 so that the latch element is movable to the unlatched position upon application of a predetermined force to bend the resilient element until the latch element is in the unlatched position (FIGS. 8-10). Preferably, the latch element 28 additionally includes a contact surface (i.e., a button) 74 on which the predetermined force is directable, for moving the latch element 28 to the unlatched position.

It will be appreciated by those skilled in the art that the movement of the latch elements 28A, 28B from the latched positions to the unlatched positions respectively is accomplished by the user pressing inwardly on the buttons 74A, 74B preferably formed on the latch elements 28A, 28B (FIG. 3A). Those skilled in the art would appreciate that it is desirable for the resilient element 32 to proceed substantially consistent results in each unit produced i.e., the force required to be applied to move the latch element from the latched position to the unlatched position preferably is about the same in each handheld device 26 produced.

If, for example, the resilient element were a compression coil spring, then such consistency would be difficult to achieve, due to significant variability in the characteristics of compression coil springs. Alternatively, if a torsion coil spring were used, substantially more space would be required in the housing (i.e., to accommodate the coil spring and the related mechanism) than is available, because of the force required to maintain the latch element in the latched position. A leaf spring was also considered. However, in view of the space constraints and the force required (i.e., to maintain the latch element in the latched position), it was found that an appropriately sized leaf spring would be bent beyond its tensile strength when the latch element is moved to the unlatched position, i.e., the leaf spring would fail.

Preferably, the resilient element 32 is an elongate wire with a substantially consistent cross-sectional area. The wire preferably is made of any suitable material (e.g., a suitable steel), and may be, for example, a suitable piano wire. The use of the single strand of wire as the resilient element 32 is advantageous because it is likely to provide consistent results regarding the amount of force required to be applied against the buttons 74A, 74B to move the latch elements 28A, 28B from the latched positions to the unlatched positions. Where a number of samples of the wire have substantially the same diameter, the most important factor affecting the amount of force required to bend the wire is the preselected distance, which is determined by the positioning of the wire between the first pivot point 68 and the engagement region 70, assuming a consistent cross-section.

Figure 5:
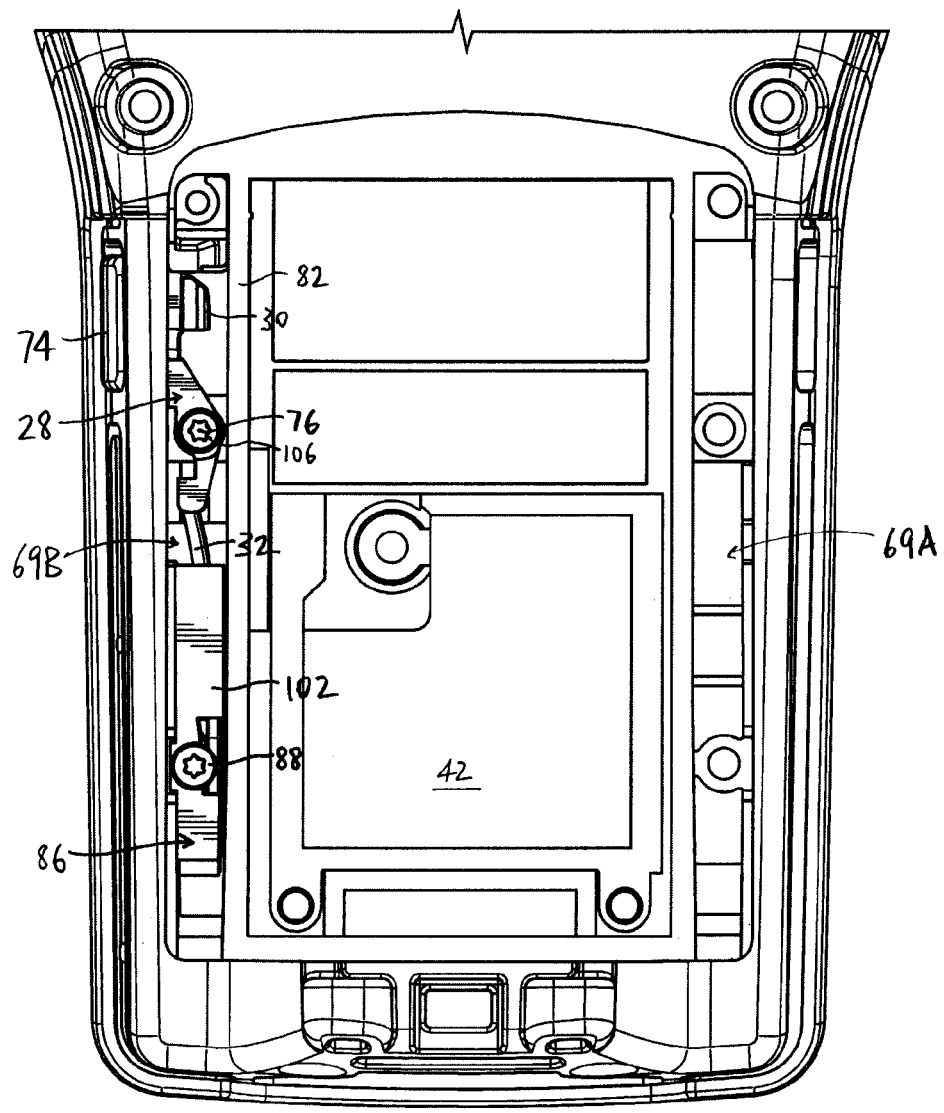
FIG. 5 is a bottom plan view of a housing of the handheld device of FIG. 1 with an embodiment of a latch assembly of the invention attached to the housing, the latch element being shown in the free position.

Preferably, the latch element 28 is pivotable between the free and unlatched positions about a second pivot point 76 (FIGS. 5, 10). For example, the latch element 28 is shown in FIG. 7 in the latched position. If the user pushes inwardly on the button 74 (i.e., in the direction indicated by arrow H in FIG. 7) with sufficient force to overcome the resistance thereto offered by the resilient element 32, the latch element 28 pivots about the second pivot point 76 toward the unlatched position (FIGS. 8-10).

Figure 6:
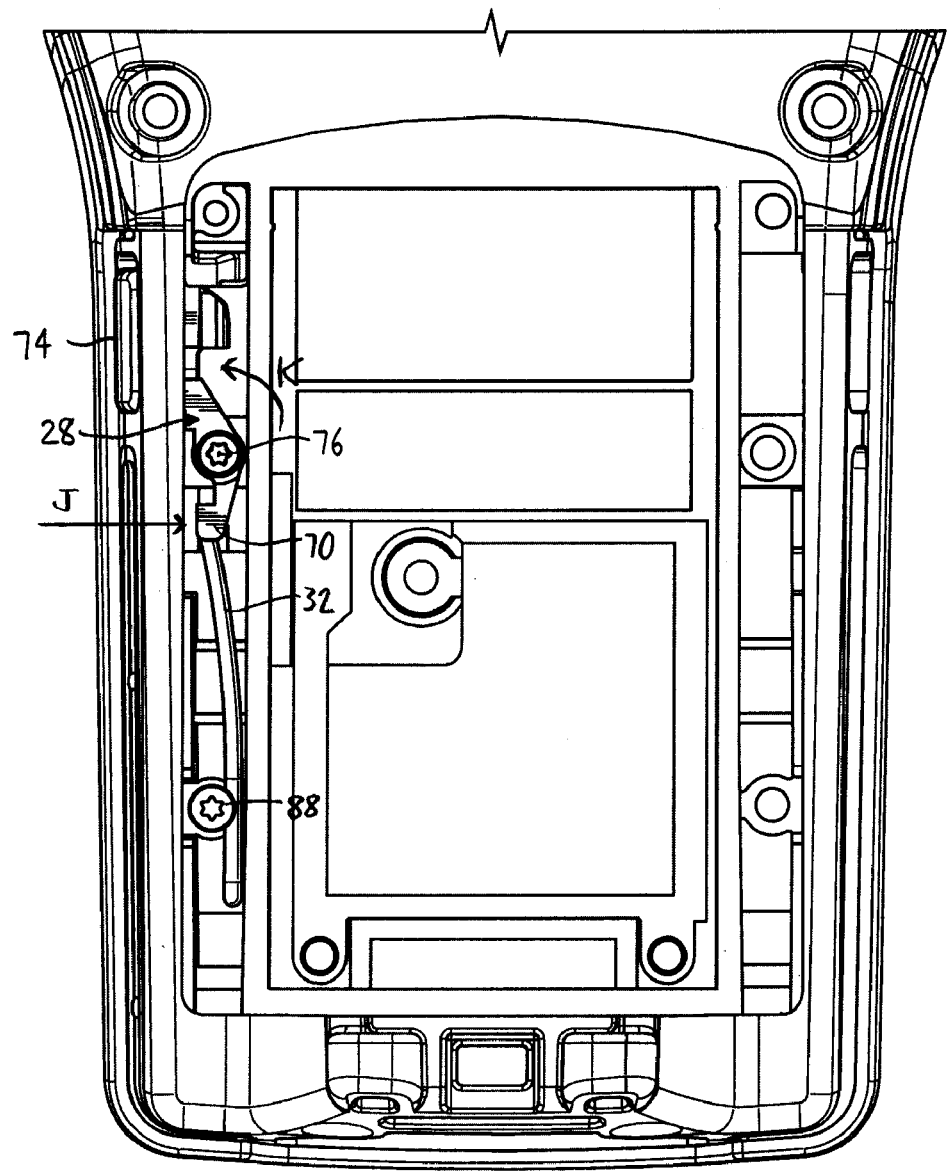
FIG. 6 is a bottom plan view of the housing and the latch assembly of FIG. 5 in which an anchor portion is omitted, for illustrative clarity.

For example, and as can be seen in FIG. 6, when the latch element 28 is in the free position or the latched position, the resilient element 32 presses inwardly against the engagement region 70 on the latch element 28 (i.e., in the direction indicated by arrow "J" in FIG. 6), urging the latch element 28 to pivot about the second pivot point 76 in the direction indicated by arrow "K" in FIG. 6 (i.e., in a counter clockwise direction, as presented in FIG. 6).

When the latch element 28 is to be moved to the unlatched position, as noted above, the user presses against the contact surface or button 74 in the direction indicated by arrow "H" in FIG. 7. As can be seen in FIG. 9, when the predetermined force is directed against the contact surface 74, the latch element 28 pivots about the second pivot point 76 in the direction indicated by arrow "L", so that the engagement region 70 is moved in the direction indicated by arrow "M". As described above, this pivoting movement of the latch element 28 to the unlatched position occurs because the predetermined force applied to the contact surface 74 is sufficient to cause the resilient element 32 to be bent in the direction indicated by arrow M From the foregoing, it can be seen that where the user pushes the buttons 74 on each side of the housing 24 at substantially the same time, the two latch elements 28A, 28B (FIG. 3A) are both moved to the unlatched position substantially simultaneously. Upon the latch elements 28 being moved to the unlatched positions therefor, the abutment 36 is able to move in the direction indicated by arrow C in FIG. 3C, because the second mating surface 62 of the tab portion 30 is not positioned to oppose such movement.

It will be understood that the handheld device 26, as shown in FIG. 1, is inverted from its normal position, i.e., the handheld device is shown with its top face 78 down. In use, except when inserting the battery module, the user preferably holds the handheld device 26 with the top face 78 facing generally upwardly, to enable the user to activate and operate the handheld device. It will be appreciated by those skilled in the art that the user can achieve a one-hand operation of the two buttons. For instance, if the handheld device 26 is held with its top face 78 facing upwardly, the user can press inwardly on the two buttons simultaneously (i.e., with a thumb pressed against one button, and any suitable finger pressed against the other button), thereby substantially simultaneously moving the two latch elements 28A, 28B to the unlatched positions therefore. The user's palm preferably is positioned underneath the battery module, so that the user can catch the released battery module in the same hand used to press against the buttons 74A, 74B.

Figure 11A:
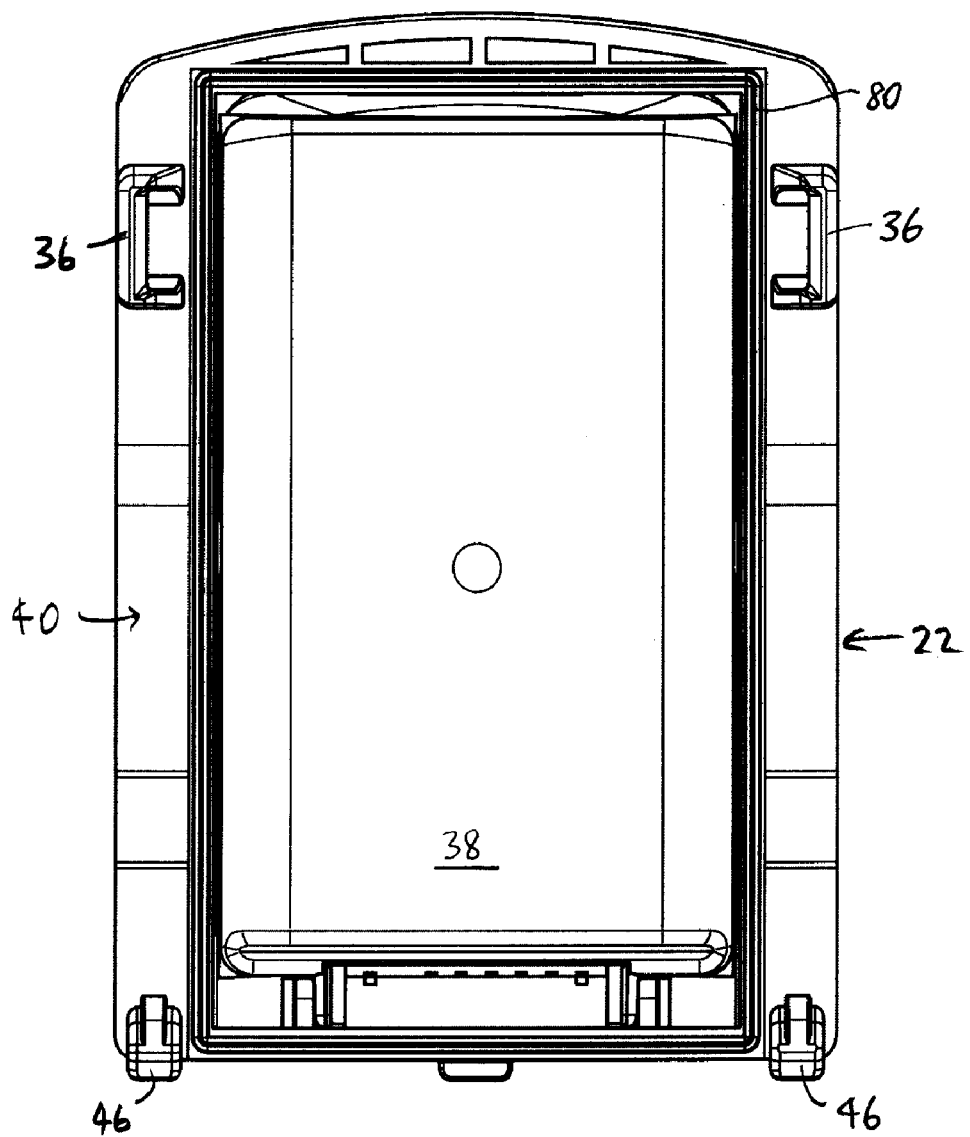
FIG. 11A is a bottom plan view of an embodiment of the battery module of the invention, drawn at a larger scale.
Figure 11B:
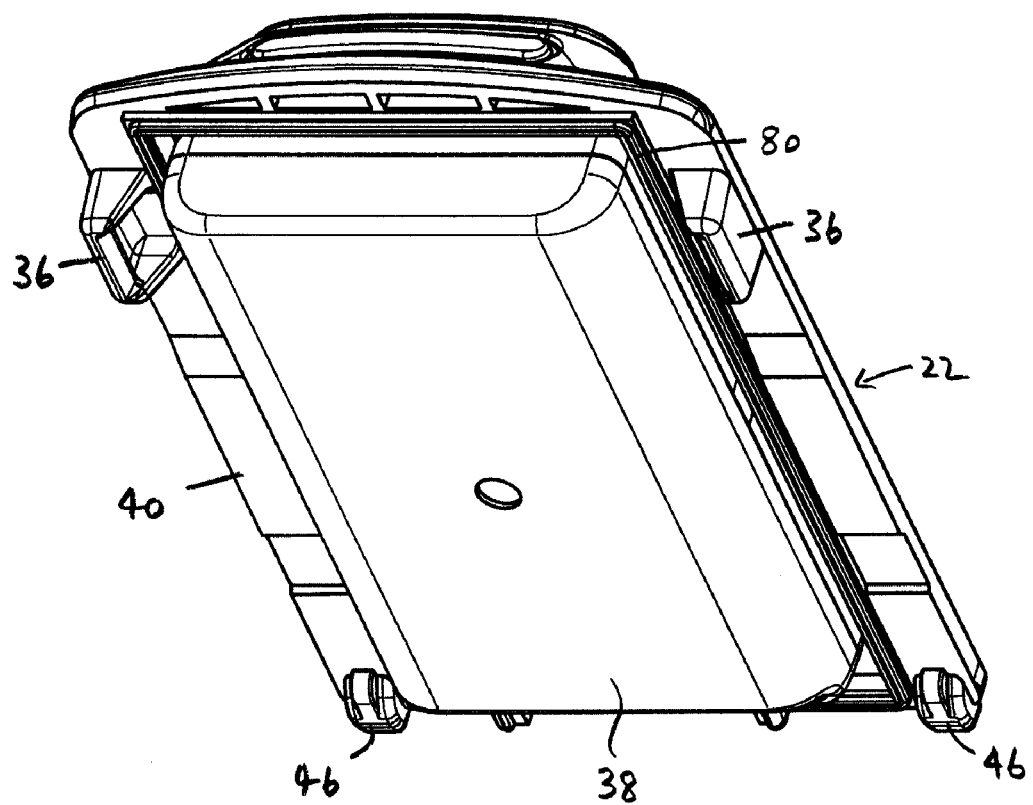
FIG. 11B is an isometric view of the battery module of FIG. 11A.
Figure 11C:
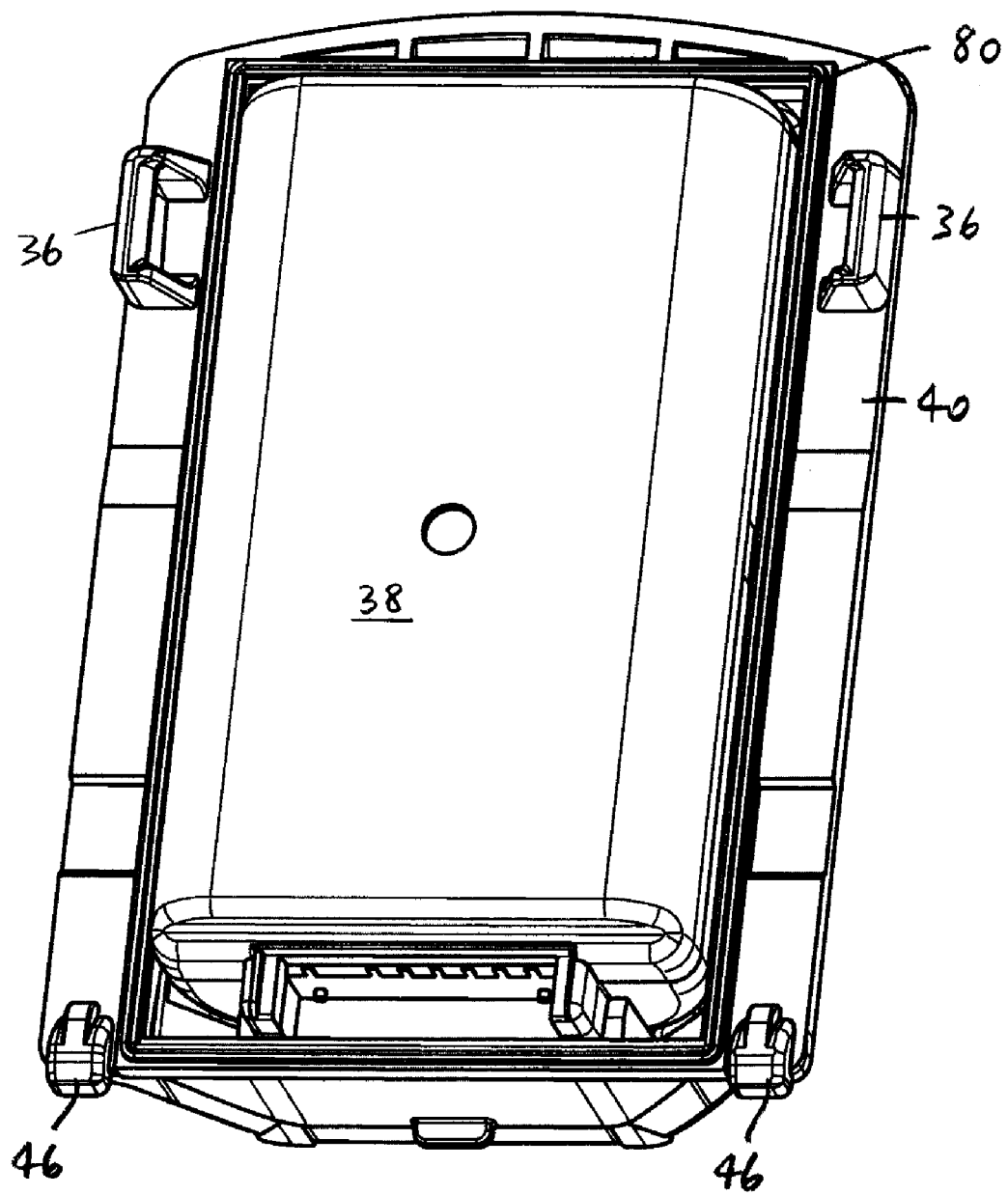
FIG. 11C is another isometric view of the battery module of FIG. 11A.

As can be seen in FIGS. 11A-11C, the battery module 22 preferably includes a seal 80 mounted on the cover portion 40 so that the seal 80 defines a perimeter around the battery 38, for protecting the battery 38. As shown in FIGS. 5, 6, 8, and 9, the recess 42 preferably is at least partially defined by one or more walls 82 integrally formed in the housing 24. The seal 80 is formed and positioned on the cover portion 40 so that it is substantially aligned with the wall 82 when the battery module 22 is at least partially in the recess, so that the seal 80 engages the wall 82 all around the battery 38. As shown in FIG. 3A, the seal 80 preferably includes ridges or other suitable protrusions to facilitate sealing engagement of the seal 80 with the wall 82. The seal 80 preferably is made of any suitable material or materials, e.g., silicone rubber, and is intended to keep dust and/or water from getting between the battery and the housing, when the battery module is secured to the housing.

Figure 12:
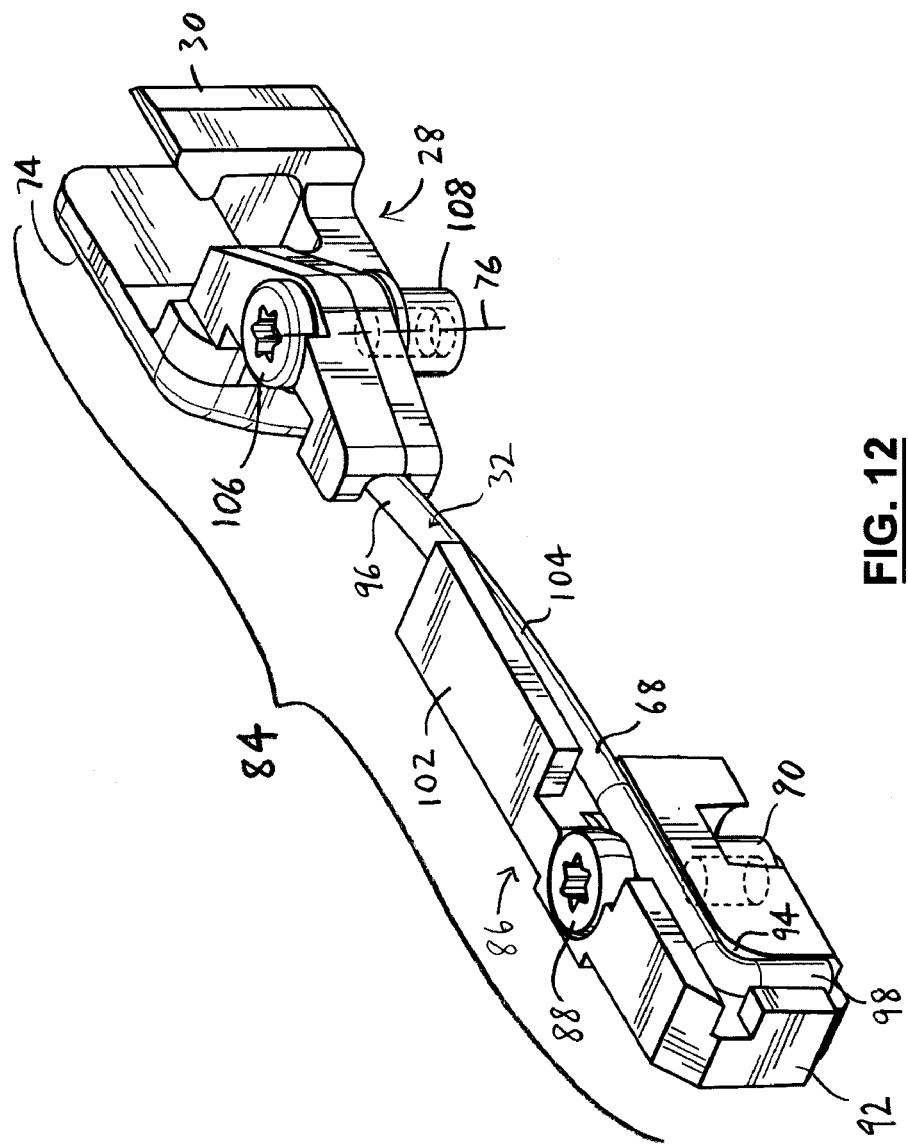
FIG. 12 is an isometric view of the latch assembly of FIGS. 6-10, drawn at a larger scale.
Figure 13:
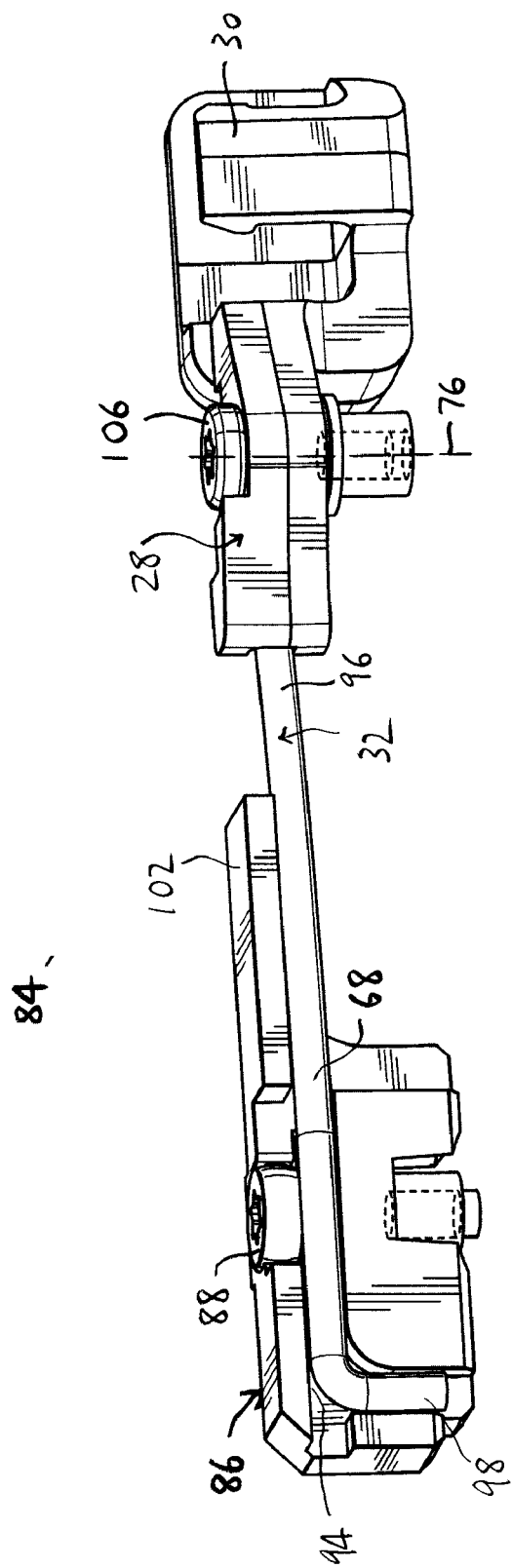
FIG. 13 is a side view of an inner side of the latch assembly of FIG. 11A.
Figure 14:
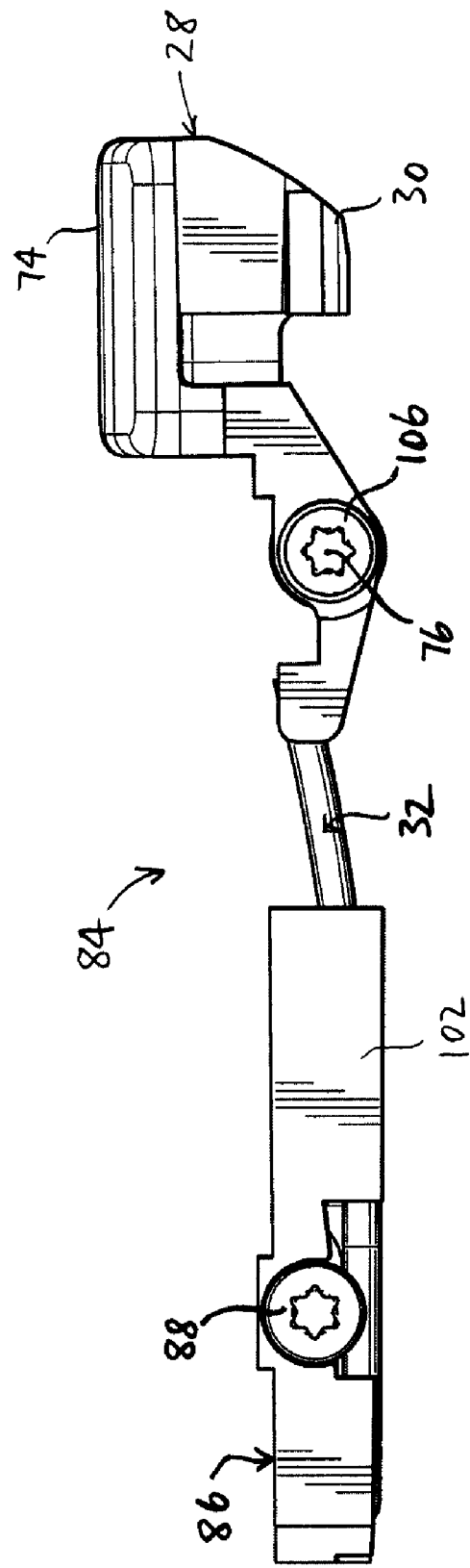
FIG. 14 is a bottom plan view of the latch assembly of FIG. 11A.

An embodiment of a latch assembly 84 of the invention is illustrated in FIGS. 12-14. As can be seen in FIGS. 12-14, the latch assembly 84 preferably includes the latch element 28 attachable to the housing 24 and movable between free and unlatched positions, and the elongate resilient element 32 for biasing the latch element 28 to the free position. Preferably, the latch element 28 is also positionable in the latched position, in which the resilient element 32 urges the latch element 28 to the free position. In one embodiment, the latch assembly 84 preferably also includes an anchor portion 86 for securing the resilient element 32 at the second pivot point 68 relative to the housing 24. Preferably, the anchor portion 86 is attached to the housing 24 by a fastener 88 receivable in an aperture 90 formed in the housing (FIG. 10). As shown in FIG. 12, the anchor portion 86 preferably includes a main part 92 with a channel 94 defined therein in which at least part of the resilient element 32 is receivable. Preferably, the resilient element 32 is formed with first and second parts 96, 98 positioned substantially orthogonal to each other, the first part 96 being substantially longer than the second part 98. The fastener 88 engages the first part 96 of the resilient element 32 when the latch assembly is positioned in the housing 24, to secure the resilient element 32 in position in the main part 92. The first pivot point 68 is determined by the location of the fastener 88, as the first pivot point 68 is positioned proximal to the location on the first part 96 where the fastener 88 engages the first part 96 of the resilient element 32.

The first and second parts 96, 98 of the resilient element 32 preferably are substantially orthogonal to each other in order to simplify the manner in which the resilient element 32 is held in the latch assembly 84 so that the resilient element 32 is pivotable about the first pivot point 68. In one embodiment, the resilient element 32 is provided as a substantially straight piece of wire which, before the latch assembly is assembled, is formed into the first and second parts 96, 98 of the resilient element 32.

Figure 7A:
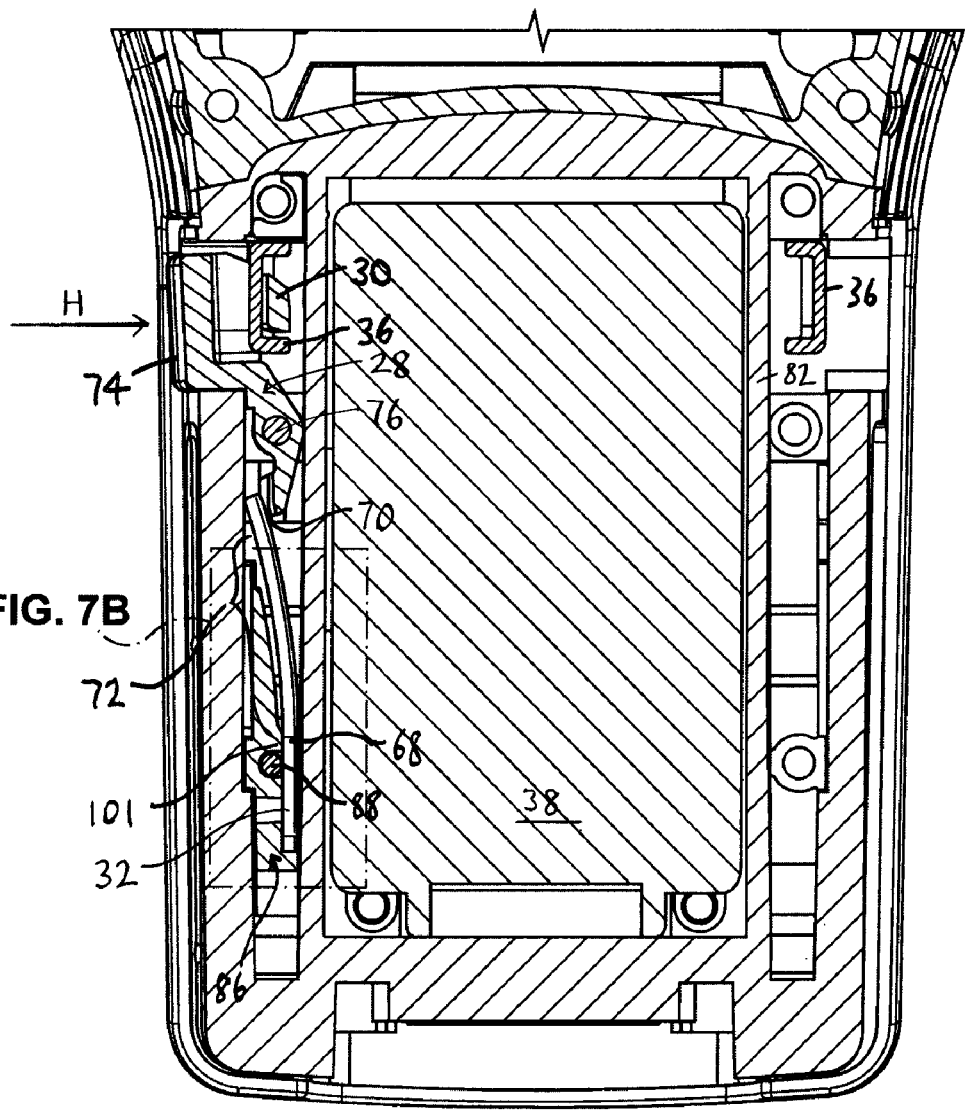
FIG. 7A is a cross-section of the housing and the latch assembly in which the latch element is shown in the latched position.
Figure 7B:
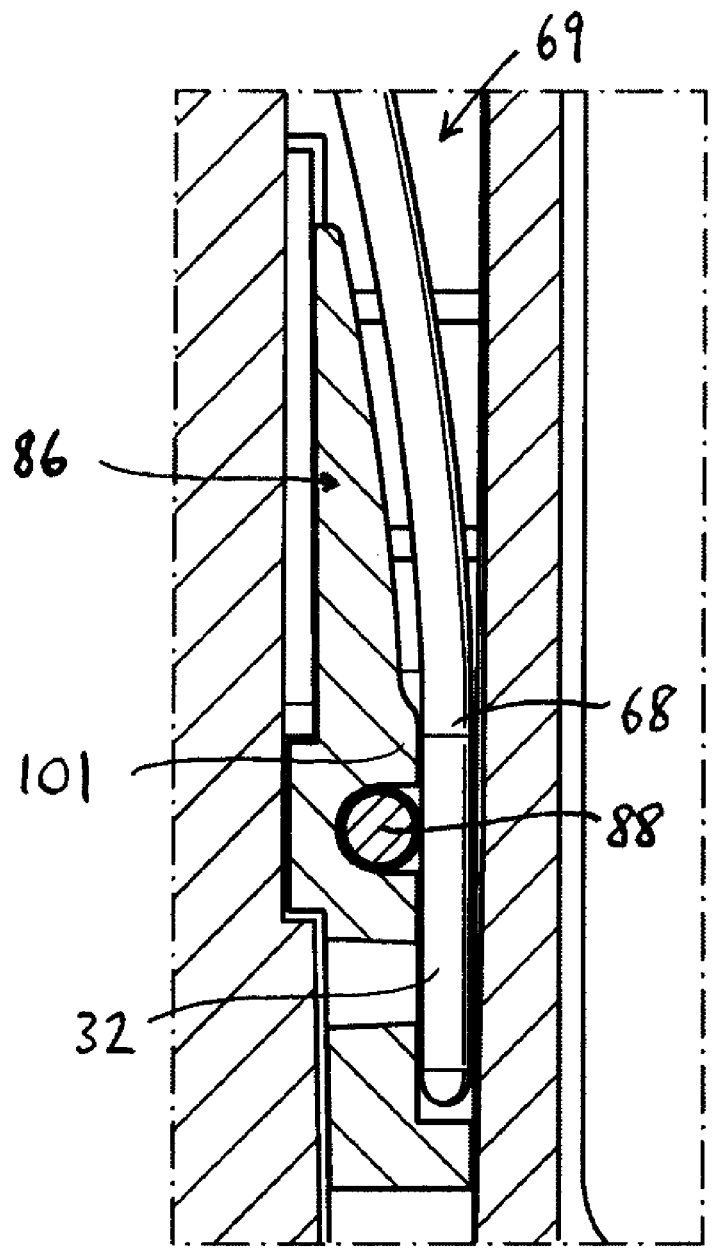
FIG. 7B is a portion of the cross-section shown in FIG. 7A, drawn at a larger scale.

As can be seen in FIGS. 7A and 7B, the anchor portion 86 preferably includes a knob part 101 positioned between the fastener 88 and the engagement region 70 of the latch element 28. The knob part 101 is also positioned proximal to the resilient element 32, and defines the first pivot point 68, which is located in the resilient element 32 at the point of engagement of the resilient element 32 with the knob part 101.

As shown in FIG. 12, the anchor portion 86 preferably also includes a guard part 102 which covers a segment 104 of the first part 96 of the resilient element 32. The purpose of the guard part 102 is to limit the user's access to the resilient element 32, for example, when the battery module 22 is not secured to the housing 24. In FIGS. 6 and 9, the guard part 102 has been omitted from the drawings for illustrative clarity, i.e., to provide views of the resilient element 32 positioned in the anchor portion 86 both when the latch element 28 is in the free position (FIG. 6) and when the latch element 28 is in the unlatched position (FIG. 9).

As can be seen, for example, in FIG. 12, the second pivot point 76 preferably is substantially defined by a suitable fastener 106 which is receivable in an aperture 108 in the housing 24 (FIG. 10). As is known in the art, the fastener 106 preferably is adapted to attach the latch element 28 to the housing 24 while permitting the latch element 28 to pivot about the second pivot point 76.

In use, to secure the battery module 22 to the housing 24, the prongs 46 are inserted into the apertures 50 (FIG. 4), and the battery module 22 is pivoted toward the housing 24 (as indicated by arrow D). With the latch elements 28 in the latched position, the movement of the battery module 22 toward the housing 24 brings the second engagement surfaces 66 of the two abutments 36 into engagement with the first engagement surfaces 64 of the tab portions 30 of the two latch elements respectively, such engagement of the two abutments 36 on each side of the battery module 22 taking place substantially simultaneously. The battery module 22 is moved further toward the housing 24, resulting in an audible click confirming that the first and second mating surfaces 58, 62 are positioned facing each other, so that the tab portions 30 are holding the abutments 36 in the retainable position.

As indicated above, the resilient elements 32 in each latch assembly 84 bias the latch elements 28 to the free position with sufficient force that the latch elements 28 are unlikely to be moved to the unlatched positions due to drop, shock, or vibration (e.g., if the handheld device 26 is dropped).

To release the battery module 22 from the housing (e.g., for recharging), the handheld device 26 preferably is held by the user with the top face 78 facing upward. For one-hand release, the user presses inwardly on the buttons 74 on each side of the handheld device 26 at approximately the same time, to move the latch elements 28 from the latched positions to the unlatched positions. This can be done most effectively, for instance, if the user's thumb and an opposing digit are used to press on the buttons 74. The battery module 22 pivots away from the housing 24 as indicated by arrow E (under the influence of gravity, if the handheld device 26 is held with the top face 78 facing upwardly), removing the prongs 46 from the apertures 50 as the battery module 22 falls into the user's palm positioned below the battery module 22.

From the foregoing, it can be seen that the latch assembly of the invention, while receivable in a relatively small space in the housing of the handheld device (i.e., the slot), maintains the latch element in the latched position notwithstanding shock, and also permits a one-handed drop when the battery module is to be removed.

Any element in a claim that does not explicitly state "means for" performing a specified function, or "step for" performing a specific function, is not to be interpreted as a "means" or "step" clause as specified in 35 U.S.C. §112, paragraph 6.

It will be appreciated by those skilled in the art that the invention can take many forms, and that such forms are within the scope of the invention as described above. The foregoing descriptions are exemplary and their scope should not be limited to the preferred versions contained herein.

I claim:

1. A battery module mount for securing a battery module to a housing of a handheld device, comprising:

two latch elements attached to the housing on opposite sides thereof, each said latch element being movable between a free position and an unlatched position therefor, each said latch element comprising a tab portion;

two elongate wires, each said wire being operatively associated with each said latch element respectively, each said wire having a substantially consistent cross-sectional area and biasing the latch element associated therewith to the free position therefor;

each said latch element being positionable in a latched position, in which the wire associated therewith urges each said latch element respectively to the free position therefor;

two mating means attached to the battery module on opposite sides thereof, each said mating means being operatively associated with each said tab portion respectively, each said mating means comprising an abutment with which the tab portions are respectively engageable when the latch elements are in the latched position to hold the abutments in retainable positions respectively, thereby securing the battery module to the housing; and each of the tab portions being disengaged from the abutments when the latch elements are each in the unlatched position therefor, to permit removal of the battery module from the housing.

2. A battery module mount according to claim 1 in which:

each of the elongate wires is pivotable about a first pivot point and engages the latch element associated therewith at an engagement region thereon; and the first pivot point and the engagement region are spaced apart by a preselected distance such that each of the latch elements is movable to the unlatched position therefor upon application of a predetermined force to bend the elongate wire associated therewith, for moving the latch element thereby engaged to the unlatched position therefor.

3. A battery module mount according to claim 1 in which each of the latch elements is pivotable between the free and unlatched positions therefor about a second pivot point.

4. A battery module mount according to claim 2 in which each said latch element additionally comprises a contact surface on which the predetermined force is directable, for moving each said latch element to the unlatched position therefor.

5. A battery module mount according to claim 1 in which the mating means are included in a cover portion of the battery module.

6. A battery module mount according to claim 1 in which each said tab portion comprises a first engagement surface formed for slidingly engaging a second engagement surface of the abutment included in the mating means associated with the tab portion when the latch element is in the free position, as the abutment is moved into the retainable position therefor.

7. A battery module mount according to claim 6 in which the first engagement surface is substantially planar and the second engagement surface is at least partially rounded.

8. A battery module mount according to claim 7 in which each said tab portion and the abutment of the mating means associated with each said tab portion respectively cooperate, as the abutment is moved into the retainable position therefor and the latch element comprising the tab portion moves to the latched position therefor, to provide an audible signal confirming that the tab portion engages the abutment, to hold the abutment in the retainable position.

9. A battery module mount according to claim 1 in which, when the abutments move to the respective retainable positions therefor and said at the latch elements move to the respective latched positions therefor, the latch elements and the abutments respectively engageable therewith cooperate to produce at least one audible signal confirming that the battery module is secured to the housing.

10. A latch assembly for co-operating with two mating means to secure a battery module to a housing of a handheld device, the latch assembly comprising:

two latch elements attachable to the housing on opposite sides thereof, each said latch element being movable between a free position and an unlatched position therefor, each said latch element comprising a tab portion;

two elongate wires, each said wire being operatively associated with each said latch element respectively, each said wire having a substantially consistent cross-sectional area and biasing the latch element associated therewith to the free position therefor;

each said latch element being positionable in a latched position therefor, in which the wire associated therewith urges each said latch element to the free position therefor;

each said tab portion being operatively associated with one of said mating means respectively;

each said tab portion being engageable to hold an abutment included in the mating means associated therewith in a retainable position when each said latch element is in the latched position therefor, thereby securing the battery module to the housing; and said tab portions being respectively disengagable from the abutments when said latch elements are in the unlatched positions therefor, to permit removal of the battery module from the housing.

11. A latch assembly according to claim 10 in which;

each of the elongate wires is pivotable about a first pivot point and engages the latch element associated therewith at an engagement region thereon; and the first pivot point and the engagement region are spaced apart by a preselected distance such that each of the latch elements is movable to the unlatched position therefor upon application of a predetermined force required to bend the elongate wire associated therewith, for moving the latch element thereby engaged to the unlatched position therefor.

12. A latch assembly according to claim 10 in which each of the latch elements is pivotable between the free and unlatched positions therefor about a second pivot point.

13. A latch assembly according to claim 11 in which each said latch element additionally comprises a contact surface on which the predetermined force is directable, for moving each said latch element to the unlatched position therefor.

14. A latch assembly according to claim 10 in which each said tab portion comprises a first engagement surface formed for slidingly engaging a second engagement surface of the abutment included in the mating means associated with the tab portion, as the abutment is moved into the retainable position and the latch element associated therewith is in the free position.

15. A latch assembly according to claim 14 in which the first engagement surface is substantially planar.

16. A latch assembly according to claim 15 in which each said tab portion and the abutment of the mating means associated with each said tab portion respectively cooperate, as the abutment is moved into the retainable position therefor and the latch element comprising the tab portion moves to the latched position therefor, to provide an audible signal confirming that the tab portion is engaging the abutment, to hold the abutment in the retainable position.

17. A latch assembly according to claim 11 in which, when the abutments move to the respective retainable positions therefor and the latch elements move to the respective latched positions therefor, the latch elements and the abutments respectively engageable therewith cooperate to produce at least one audible signal confirming that the battery module is secured to the housing.

18. A handheld device comprising:

a housing;

a battery module;

a battery module mount for securing the battery module to the housing, comprising:

two latch elements attached to the housing on opposite sides thereof, each said latch element being movable between a free position and an unlatched position therefor, each said latch element comprising a tab portion;

two elongate wires, each said wire being operatively associated with each said latch element respectively, each said wire having a substantially consistent cross-sectional area biasing the latch element associated therewith to the free position therefor;

each said latch element being positionable in a latched position, in which the wire associated therewith urges each said latch element respectively to the free position therefor;

two mating means attached to the battery module on opposite sides thereof, each said mating means being operatively associated with each said tab portion respectively, each said mating means comprising an abutment with which the tab portions are engageable when the latch elements are in the latched position to hold the abutments in retainable positions respectively, thereby securing the battery module to the housing; and each of the tab portions being disengaged from the abutments when the latch elements are each in the unlatched position therefor, to permit removal of the battery module from the housing.

19. A handheld device according to claim 18 in which:

each of the elongate wires is anchored at a first pivot point and engages the latch element associated therewith at an engagement region thereon; and the first pivot point and the engagement region are spaced apart by a preselected distance such that each of the latch elements is movable to the unlatched position therefor upon application of a predetermined force to bend the elongate wire associated therewith, for moving the latch element thereby engaged to the unlatched position therefor.

20. A battery module mount according to claim 1 in which each of the wires is piano wire.

21. A battery module mount according to claim 1 in which each of the wires is made of steel.

* * * * *

UNITED STATES PATENT AND TRADEMARK OFFICE
CERTIFICATE OF CORRECTION

PATENT NO. : 8,048,552 B1  
APPLICATION NO. : 12/766029  
DATED : November 1, 2011  
INVENTOR(S) : Mao Page 1 of 1

It is certified that error appears in the above-identified patent and that said Letters Patent is hereby corrected as shown below:

In the Claims

In Column 9, Line 66, delete "and said at" and insert -- and --, therefor.

In Column 10, Line 31, delete "which;" and insert -- which: --, therefor.

Signed and Sealed this  
Twenty-third Day of April, 2013

Teresa Stanek Rea  
*Acting Director of the United States Patent and Trademark Office*